United States Patent
Hidaka et al.

(10) Patent No.: US 12,545,314 B1
(45) Date of Patent: Feb. 10, 2026

(54) STEERING COLUMN MODULE

(71) Applicant: KAWASAKI MOTORS, LTD., Akashi (JP)

(72) Inventors: Kota Hidaka, Akashi (JP); Hidefumi Yasuhara, Akashi (JP); Hirotaka Fujiki, Akashi (JP); Takuma Nozaki, Akashi (JP); Daisuke Saeki, Lincoln, NE (US)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/895,423

(22) Filed: Sep. 25, 2024

(51) Int. Cl.
*B62D 1/16* (2006.01)
*B60Q 1/00* (2006.01)

(52) U.S. Cl.
CPC .............. *B62D 1/16* (2013.01); *B60Q 1/0076* (2013.01)

(58) Field of Classification Search
CPC ......... B60Q 1/0076; B60K 35/10; B62D 1/16
See application file for complete search history.

(56) References Cited

U.S. PATENT DOCUMENTS

| | | | | |
|---|---|---|---|---|
| 6,578,449 | B1 * | 6/2003 | Anspaugh | B62D 1/16 74/484 R |
| 7,565,940 | B2 * | 7/2009 | Byrne | B62D 1/16 280/775 |
| 2005/0028635 | A1 | 2/2005 | Onoda et al. | |
| 2007/0131051 | A1 * | 6/2007 | Byrne | B62D 1/16 74/492 |
| 2007/0145731 | A1 * | 6/2007 | Ikeda | B62D 1/187 280/775 |
| 2009/0266635 | A1 * | 10/2009 | Sato | B60K 35/00 296/97.7 |
| 2022/0057792 | A1 * | 2/2022 | Kim | B60T 7/16 |

FOREIGN PATENT DOCUMENTS

| | | | | |
|---|---|---|---|---|
| CN | 111907585 A | * | 11/2020 | ............. B60K 35/10 |
| CN | 217598344 U | * | 10/2022 | |
| CN | 117246224 A | * | 12/2023 | ............. B60K 35/22 |
| DE | 102018101492 A1 | * | 7/2018 | ............. B62D 1/283 |
| EP | 1081035 A2 | * | 3/2001 | ............. G01S 19/35 |
| IN | 202111018899 A | * | 2/2002 | |
| JP | 2001063590 A | * | 3/2001 | |
| JP | 2002347632 A | * | 12/2002 | |
| JP | 2003146223 A | * | 5/2003 | ........... B60Q 1/1461 |
| JP | 2006143129 A | * | 6/2006 | |
| JP | 2007106322 A | * | 4/2007 | |
| JP | 2008037137 A | * | 2/2008 | |
| JP | 2008126995 A | * | 6/2008 | |
| JP | 2008126996 A | * | 6/2008 | |
| JP | 2008181718 A | * | 8/2008 | |
| JP | 2009023611 A | * | 2/2009 | |
| JP | 2009023612 A | * | 2/2009 | |

(Continued)

*Primary Examiner* — Nicole T Verley
(74) *Attorney, Agent, or Firm* — XSENSUS LLP

(57) ABSTRACT

A steering column module 10 includes: an upper cover 3 covering a steering shaft 11 from above; a lower cover 4 covering the steering shaft 11 from below and coupled to the upper cover 3; a meter 61 located on the upper cover 3; an ignition switch 62 located on the upper cover 3; and a direction switch 63 that is located on upper cover 3 and switches a vehicle between forward movement and rearward movement.

20 Claims, 9 Drawing Sheets

(56) References Cited

FOREIGN PATENT DOCUMENTS

| JP | 2010247737 | A | * | 11/2010 | | |
|----|------------|----|---|---------|---|---|
| JP | 4642651 | B2 | * | 3/2011 | ............. | B62D 1/187 |
| JP | 2011235707 | A | * | 11/2011 | | |
| JP | 4955333 | B2 | * | 6/2012 | | |
| JP | 2016084124 | A | * | 5/2016 | ............. | B62D 1/189 |
| JP | 2016096734 | A | * | 5/2016 | | |
| WO | WO-2007034440 | A1 | * | 3/2007 | ............... | B62D 1/16 |
| WO | WO-2016060021 | A1 | * | 4/2016 | ............... | B62D 1/18 |

* cited by examiner

STEERING COLUMN MODULE

FIELD

The technique disclosed here relates to a steering column module.

BACKGROUND

U.S. Patent Application Publication No. 2005/0028635 discloses a cover that covers a steering shaft. The cover is equipped with a meter and other devices. The cover is also divided into upper and lower sections.

SUMMARY

The cover can be equipped with various devices as well as the meter. In such a case, assembly of the steering column module can be complicated.

It is therefore an object of the technique disclosed here to enhance assembly efficiency of a steering column module.

A steering column module disclosed here includes: an upper cover covering a steering shaft from above; a lower cover covering the steering shaft from below and coupled to the upper cover: a meter located on the upper cover; an ignition switch located on the upper cover; and a direction switch that is located on the upper cover and switches a vehicle between forward movement and rearward movement.

The steering column module can enhance assembly efficiency.

DESCRIPTION OF EMBODIMENTS

An exemplary embodiment will be described in detail hereinafter with reference to the drawings.

Figure 1:
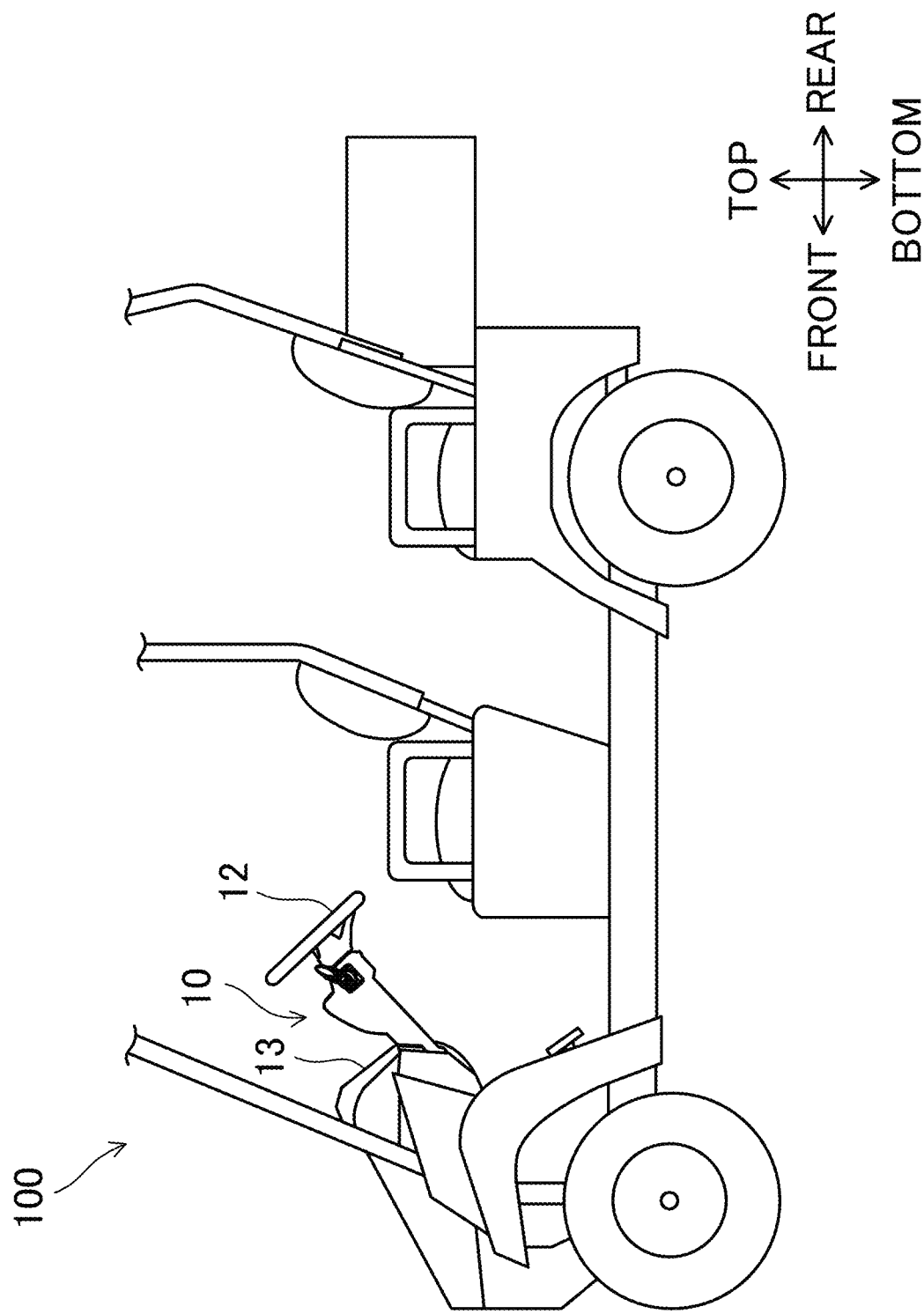
FIG. 1 is a side view of a utility vehicle.

FIG. 1 is a side view of a utility vehicle 100. Hereinafter, the utility vehicle 100 will also be referred to simply as a "vehicle 100." The vehicle 100 is an example of a vehicle. The vehicle 100 is a vehicle intended to travel at low speed in a limited area. Examples of the limited area include a limited community area, a private road, and a private property (e.g., a golf course, a park, etc.). The limited community area refers to an area available for use by local residents. The community area is, for example, an area including houses and public facilities (e.g., schools, hospitals, etc.), and is an area where the vehicle 100 not intended to travel on a public road is permitted to travel at low speed. The low speed refers to a speed up 20 mph to 30 mph, for example. The vehicle 100 includes, for example, a personal transport vehicle (PTV). The PTV includes a golf cart.

In this disclosure, components of the vehicle 100 will be described based on directions of the vehicle 100. Specifically, "front" refers to the front of the vehicle 100 in the vehicle front-rear directions, and "rear" refers to the rear of the vehicle 100 in the vehicle front-rear directions. "Left" refers to the left of the vehicle 100 when seeing forward, and "right" refers to the right of the vehicle 100 when seeing forward. The "vehicle width directions" refer to the vehicle width directions of the vehicle 100, in other words, mean the left-right directions of the vehicle 100 and will be sometimes referred to as "left-right directions." An "inner side in the vehicle width direction" refers to a cabin side in the vehicle width directions, and an "outer side in the vehicle width direction" refers to an outer side of the vehicle in the vehicle width directions. The expression "a member extends or expands in a direction" herein includes not only a case where the member extends or expands strictly in parallel with the direction" but also a case where the member extends or expands generally in the direction."

The vehicle 100 includes a steering column module 10. The steering column module 10 is located in a cabin of the vehicle 100. Specifically, the steering column module 10 is located in a dashboard panel 13.

Figure 2:
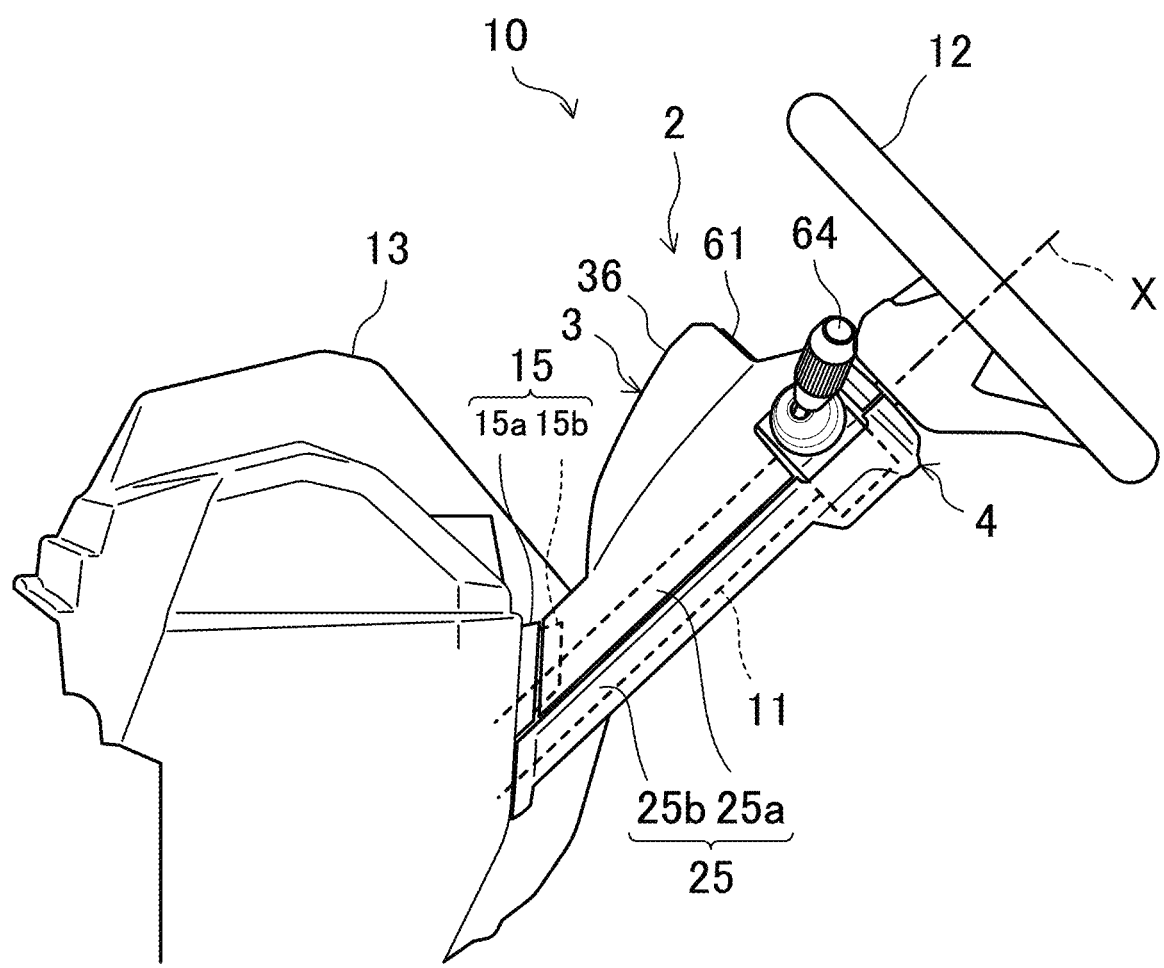
FIG. 2 is a side view of the steering column module when seen from the left.
Figure 3:
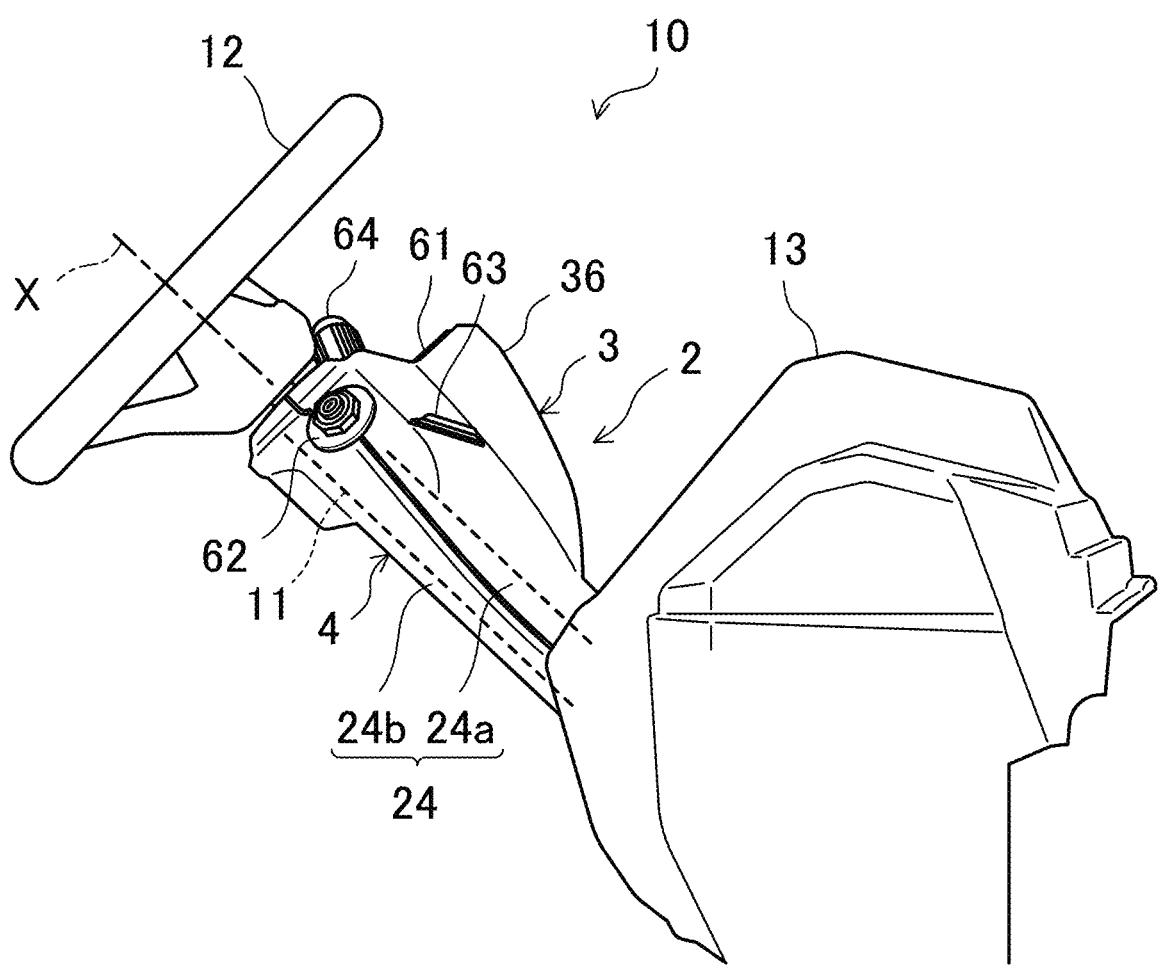
FIG. 3 is a side view of the steering column module when seen from the right.
Figure 4:
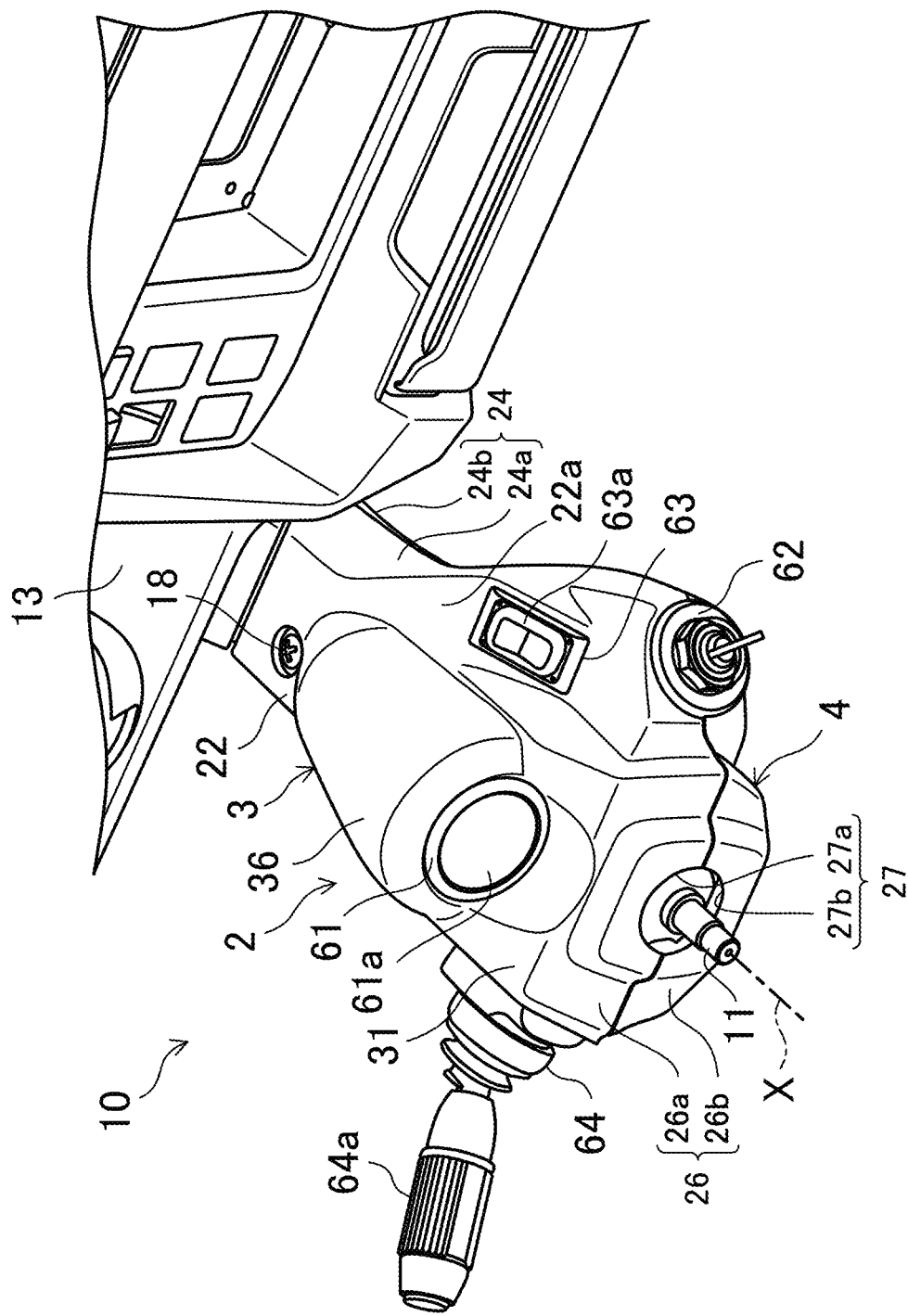
FIG. 4 is a perspective view of the steering column module when seen from obliquely above.
Figure 5:
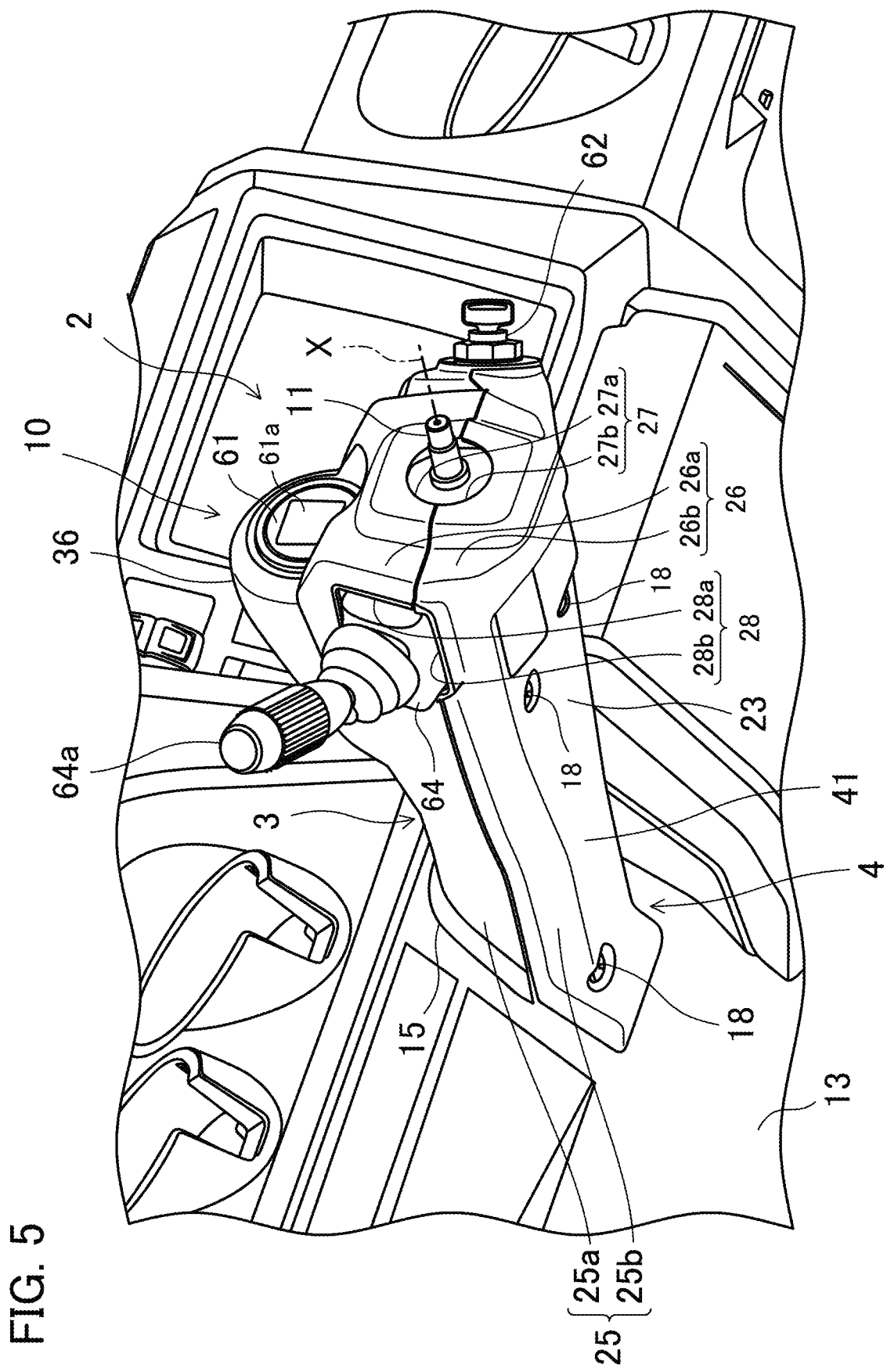
FIG. 5 is a perspective view of the steering column module when seen from obliquely below.

FIG. 2 is a side view of the steering column module 10 when seen from the left. FIG. 3 is a side view of the steering column module 10 when seen from the right. FIG. 4 is a perspective view of the steering column module 10 when seen from obliquely above. FIG. 5 is a perspective view of the steering column module 10 when seen from obliquely below. FIGS. 4 and 5 do not show a steering wheel 12. The steering column module 10 includes an upper cover 3, a lower cover 4, a meter 61, an ignition switch 62, and a direction switch 63. The upper cover 3 and the lower cover 4 are combined as a unit and cover a steering shaft 11. The steering shaft 11 extends into the cabin through the dashboard panel 13. An axis X of the steering shaft 11 tilts with respect to the front-rear directions. The steering wheel 12 is attached to an end of the steering shaft 11 on the cabin inner side. The upper cover 3 and the lower cover 4 extend from the end of the steering shaft 11 on the cabin inner side to the dashboard panel 13. The steering column module 10 further includes a turn signal switch 64.

In the following description, a direction of the axis X of the steering shaft 11 will be referred to simply as an "axial direction" for convenience of description. The axis X extends generally in the front-rear directions. Strictly, the axis X tilts to rise toward the rear.

The meter 61 displays a vehicle speed, for example. The meter 61 can also display information other than the vehicle speed. As illustrated in FIG. 4, the meter 61 includes a display 61a.

The ignition switch 62 is a switch that is operated by a passenger to switch an engine between on and off and to control an electric circuit. The ignition switch 62 includes a key cylinder. The key cylinder has a keyhole in which an engine key is inserted.

The direction switch 63 is a switch that is operated by a passenger to switch the vehicle between forward movement and rearward movement. For example, the direction switch 63 is a locker switch including an operation button 63a capable of switching between a first state and a second state. For example, the first state corresponds to forward movement, and the second state corresponds to rearward movement. Depending on the state of the operation button 63a, the vehicle is switched between forward movement and rearward movement.

The turn signal switch 64 is a switch that is operated by a passenger to switch a turn signal between on and off. For example, the turn signal switch 64 is a lever switch including a lever 64a. Depending on the state of the lever 64a, one of a left turn signal and a right turn signal is transmitted.

Figure 6:
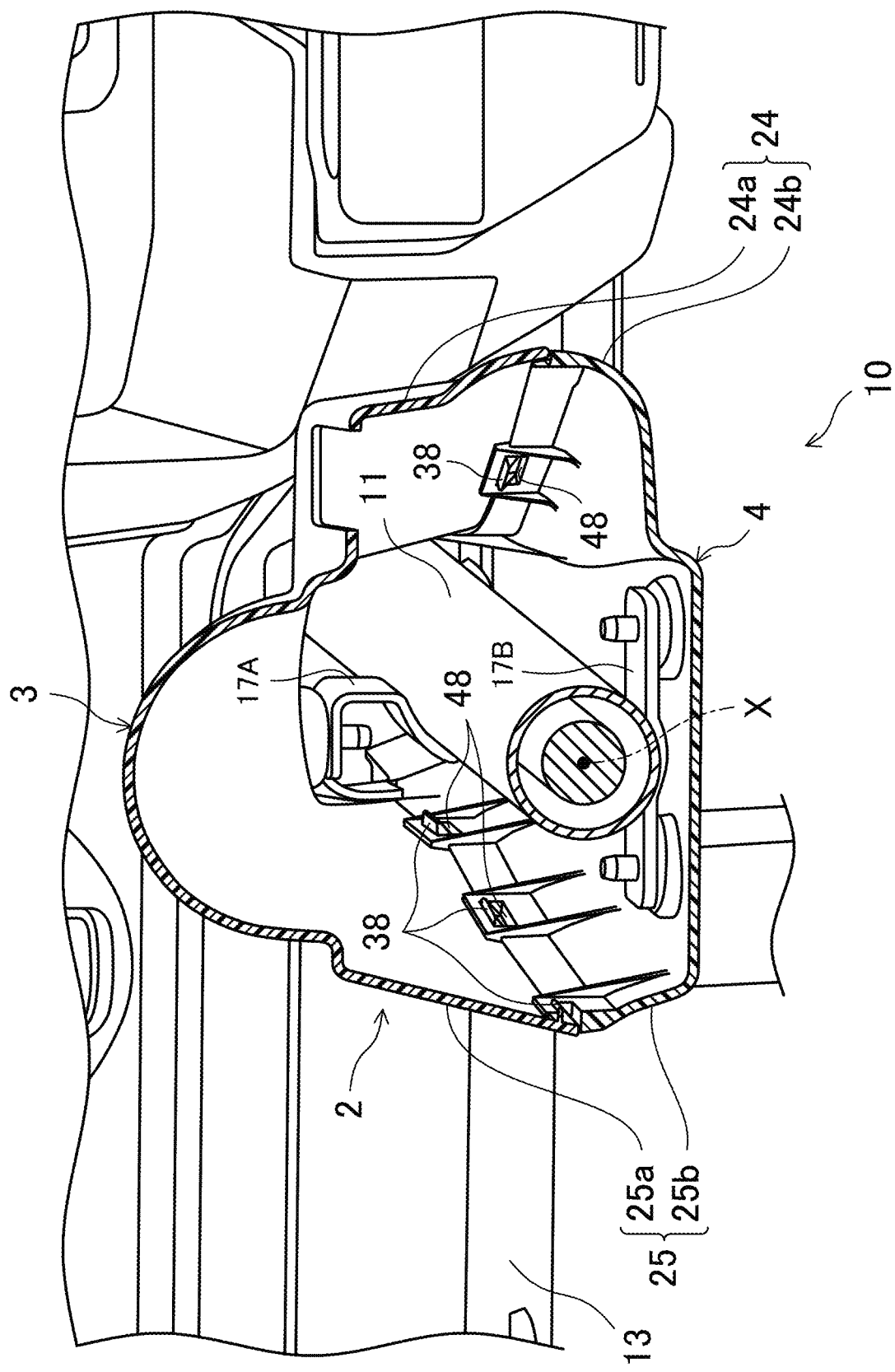
FIG. 6 is a perspective view of the steering column module cut in a plane orthogonal to an axis.

FIG. 6 is a perspective view of the steering column module 10 taken in a plane orthogonal to the axis X. The upper cover 3 covers the steering shaft 11 from above. Specifically, the upper cover 3 extends along the axial direction of the steering shaft 11 and bulges upward. The upper cover 3 is open downward.

The lower cover 4 covers the steering shaft 11 from below. The lower cover 4 is coupled to the upper cover 3. Specifically, the lower cover 4 extends along the axial direction of the steering shaft 11 and bulges downward. The lower cover 4 is open upward.

The steering shaft 11 is located between the upper cover 3 and the lower cover 4. The upper cover 3 and the lower cover 4 are combined to face each other, and define a cylindrical cover 2 extending in the axial direction.

As illustrated in FIG. 4, the cover 2 includes an upper wall 22 that generally faces upward, a lower wall 23 that generally faces downward, a right wall 24 that faces generally rightward, a left wall 25 that generally faces leftward, and a rear wall 26 that generally faces rearward. The lower wall 23 and the left wall 25 are shown in FIG. 5. Each of the upper wall 22, the lower wall 23, the right wall 24, the left wall 25, and the rear wall 26 is made of a curved wall. The upper wall 22, the lower wall 23, the right wall 24, the left wall 25, and the rear wall 26 are smoothly coupled to one another.

As illustrated in FIG. 4, the upper cover 3 includes a cover body 31 that bulges upward and is open downward, and a top portion 36 bulging upward from the cover body 31. The cover body 31 includes an upper wall 22 that generally faces upward, a right wall 24a that generally faces rightward, a left wall 25a that generally faces leftward, and a rear wall 26a that generally faces rearward. Each of the upper wall 22, the right wall 24a, the left wall 25a, and the rear wall 26a is made of a curved wall. The upper wall 22, the right wall 24a, the left wall 25a, and the rear wall 26a are smoothly coupled to one another.

As illustrated in FIG. 5, the lower cover 4 includes a cover body 41 that bulges downward and is open upward. The cover body 41 includes a lower wall 23 that generally faces downward, a right wall 24b that generally faces rightward, a left wall 25b that generally faces leftward, and a rear wall 26b that generally faces rearward. The right wall 24b is shown in FIG. 3. Each of the lower wall 23, the right wall 24b, the left wall 25b, and the rear wall 26b is made of a curved wall. The lower wall 23, the right wall 24b, the left wall 25b, and the rear wall 26b are smoothly coupled to one another.

As illustrated in FIG. 3, the lower edge of the right wall 24a of the upper cover 3 faces the upper edge of the right wall 24b of the lower cover 4. The right wall 24a of the upper cover 3 and the right wall 24b of the lower cover 4 constitute the right wall 24 of the cover 2. As illustrated in FIG. 5, the lower edge of the left wall 25a of the upper cover 3 faces the upper edge of the left wall 25b of the lower cover 4. The left wall 25a of the upper cover 3 and the left wall 25b of the lower cover 4 constitute the left wall 25 of the cover 2. The lower edge of the rear wall 26a of the upper cover 3 faces the upper edge of the rear wall 26b of the lower cover 4. The rear wall 26a of the upper cover 3 and the rear wall 26b of the lower cover 4 constitute the rear wall 26 of the cover 2.

As illustrated in FIG. 6, the upper cover 3 and the lower cover 4 are coupled to each other through nails 38. In this example, the upper cover 3 includes the plurality of nails 38. The nails 38 are located on each of the lower edges of the right wall 24a and the left wall 25a. The lower cover 4 includes engagement holes 48. Each of the engagement holes 48 is engaged with a corresponding one of the nails 38. The engagement holes 48 are located in each of the upper edges of the right wall 24b and the left wall 25b. The engagement of the nails 38 with the corresponding engagement holes 48 causes the upper cover 3 and the lower cover 4 to be combined as one unit.

Each of the upper cover 3 and the lower cover 4 is attached to the steering shaft 11 with screws 18. In this example, brackets 17 are fixed to the steering shaft 11. Each of the upper cover 3 and the lower cover 4 is attached to a corresponding one of the brackets 17 through the screws 18.

Figure 7:
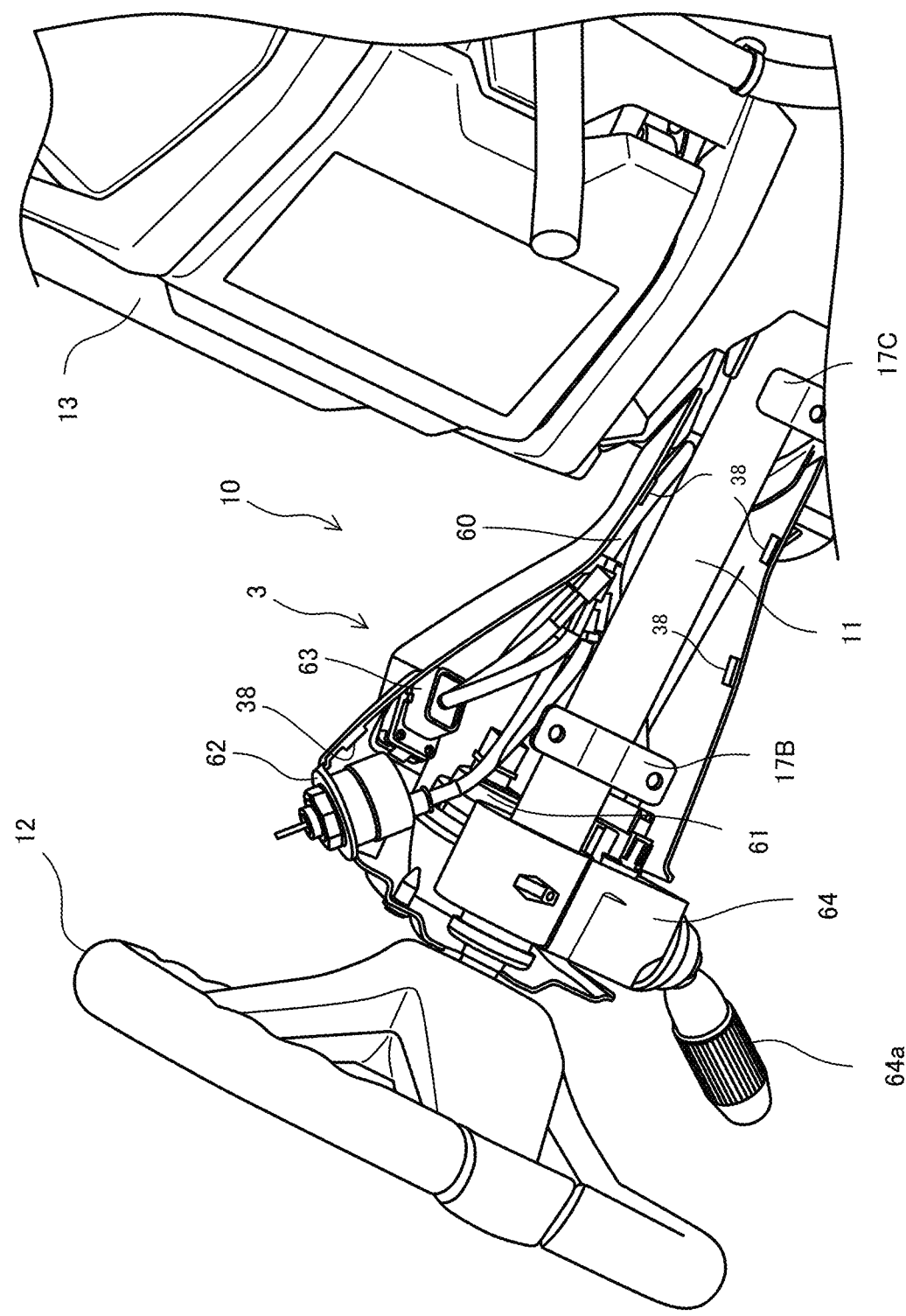
FIG. 7 is a perspective view of the steering column module from which a lower cover is detached, when seen from obliquely below.

Specifically, a first bracket 17A, a second bracket 17B, and a third bracket 17C are fixed to the steering shaft 11. As illustrated in FIG. 6, the first bracket 17A is located on an upper portion of the steering shaft 11. The first bracket 17A has one screw hole. FIG. 7 is a perspective view of the steering column module 10 from which the lower cover 4 is detached, when seen from obliquely below. As illustrated in FIG. 7, the second bracket 17B and the third bracket 17C are located on a lower portion of the steering shaft 11. With respect to the axial direction of the steering shaft 11, the second bracket 17B is located on the opposite side to, that is, rearward of, the dashboard panel 13, with respect to the third bracket 17C. The second bracket 17B has two screw holes. The third bracket 17C has one screw hole.

As illustrated in FIG. 4, the upper cover 3 is screw-fastened to the first bracket 17A through a screw 18. The first bracket 17A is not shown in FIG. 4. The upper cover 3 has a through hole in which the screw 18 is inserted. The through hole is located at a position corresponding to the first bracket 17A on the upper wall 22. The screw 18 is inserted in the through hole and fastened to the first bracket 17A. The screw 18 is located only at one position on the upper cover 3.

As illustrated in FIG. 5, the lower cover 4 is screw-fastened second bracket 17B and the third bracket 17C through screws 18. The second bracket 17B and the third bracket 17C are not shown in FIG. 5. The lower cover 4 has through holes in which the screws 18 are inserted. The through holes are located at positions corresponding to the second bracket 17B and the third bracket 17C on the lower wall 23. The screws 18 are inserted in the through holes and fastened to the second bracket 17B or the third bracket 17C. The screws 18 are located at three positions on the lower cover 4.

As illustrated in FIG. 4, the rear wall 26a of the upper cover 3 has a notch 27a in which the steering shaft 11 is inserted. The notch 27a has a substantially semicircular shape that is open downward, and is located at the lower edge of the rear wall 26a. The rear wall 26b of the lower cover 4 has a notch 27b in which the steering shaft 11 is inserted. The notch 27b has a substantially semicircular shape that is open upward, and is located at the upper edge of the rear wall 26b. The notch 27a and the notch 27b constitute a circular opening 27. The rear wall 26 of the cover 2 has the opening 27 defined by the notch 27a and the notch 27b. A rear end portion of the steering shaft 11 is exposed to the outside of the cover 2 through the opening 27.

Figure 8:
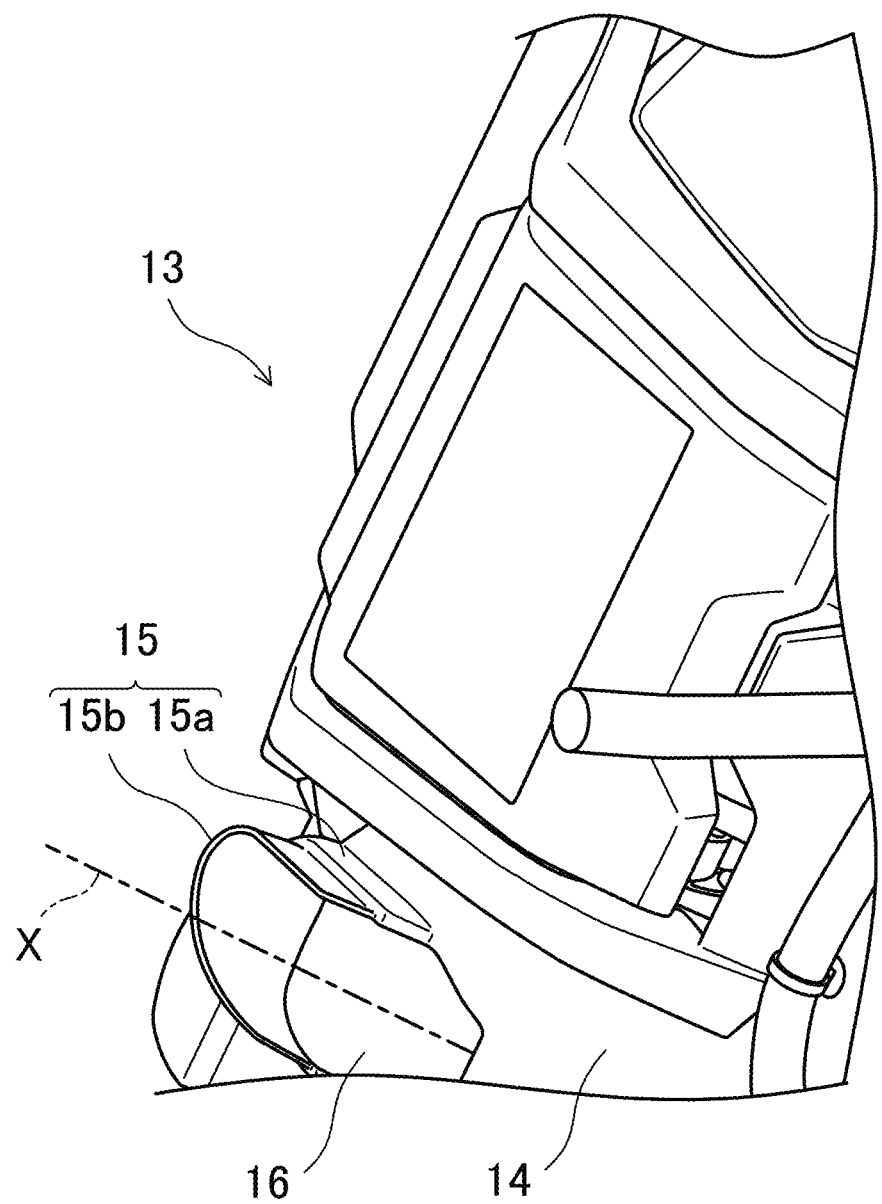
FIG. 8 is a perspective view of a dashboard panel when seen from obliquely below in a cabin.

FIG. 8 is a perspective view of the dashboard panel 13 when seen from obliquely below in the cabin. The dashboard panel 13 includes a panel body 14 having a through hole 16 through which the steering shaft 11 penetrates, and a hood 15 projecting from the panel body 14 toward the inside of the cabin at least on an upper portion of the opening edge of the through hole 16. The steering shaft 11 extends from the outside of the cabin into the cabin through the through hole 16. That is, the axis X also penetrates the through hole 16.

The hood 15 is located on at least an upper portion of the opening edge of the through hole 16. On the other hand, the hood 15 is absent at least on a lower portion of the opening edge of the through hole 16. The hood 15 has an arch shape along an upper portion of the opening edge of the through hole 16. The outer peripheral surface of the hood 15 has a step. Specifically, the hood 15 includes a first hood 15a coupled to the panel body 14, and a second hood 15b located rearward of the first hood 15a and coupled to the first hood 15a. The outer shape of the second hood 15b is smaller than the outer shape of the first hood 15a. On the outer peripheral surface of the hood 15, the second hood 15b is recessed from the first hood 15a. In other words, on the outer peripheral surface of the hood 15, the first hood 15a bulges from the second hood 15b. In this manner, on the outer peripheral surface of the hood 15, the step is located at the boundary between the first hood 15a and the second hood 15b.

An end portion of the upper cover 3 close to the dashboard panel 13, that is, a front end portion, overlaps with the hood 15, as illustrated in FIG. 2. Specifically, the front end portion of the upper cover 3 is overlaid above the second hood 15b. The outer shape of the second hood 15b fits the shape of the inner side of the front end portion of the upper cover 3. Since the front end portion of the upper cover 3 is overlaid above the hood 5, the front end portion of the upper cover 3 is located outward of the opening edge of the through hole 16. That is, the through hole 16 is located on the inner side of the upper cover 3.

An end portion of the lower cover 4 close to the dashboard panel 13, that is, a front end portion, faces the dashboard panel 13 on the outer side of the opening edge of the through hole 16, as illustrated in FIG. 5. That is, the through hole 16 is located on the inner side of the lower cover 4. The front edge of the lower cover 4 may or may not be in contact with the dashboard panel 13. Since the hood 15 is not located at least on a lower portion of the opening edge of the through hole 16, the end portion of the lower cover 4 close to the dashboard panel 13, that is, the front end portion, does not overlap with the hood 15.

In this manner, the through hole 16 is located on the inner side of the upper cover 3 and the lower cover 4. That is, the through hole 16 is covered with the upper cover 3 and the lower cover 4 to be hardly seen from the inside of the cabin. In particular, since the front end portion of the upper cover 3 is overlaid above the hood 15, a gap between the front edge of the upper cover 3 and the panel body 14 is closed by the hood 15. Accordingly, the through hole 16 is not seen at all from above the upper cover 3.

Next, arrangement of the meter 61 and other members in the cover 2 will be described in detail.

As illustrated in FIG. 4, the meter 61, the ignition switch 62, and the direction switch 63 are located on the upper cover 3. More specifically, the meter 61, the ignition switch 62, and the direction switch 63 are located only on the upper cover 3, and are not located on the lower cover 4. As illustrated in FIG. 5, the turn signal switch 64 is located at the divided portion between the upper cover 3 and the lower cover 4.

Figure 9:
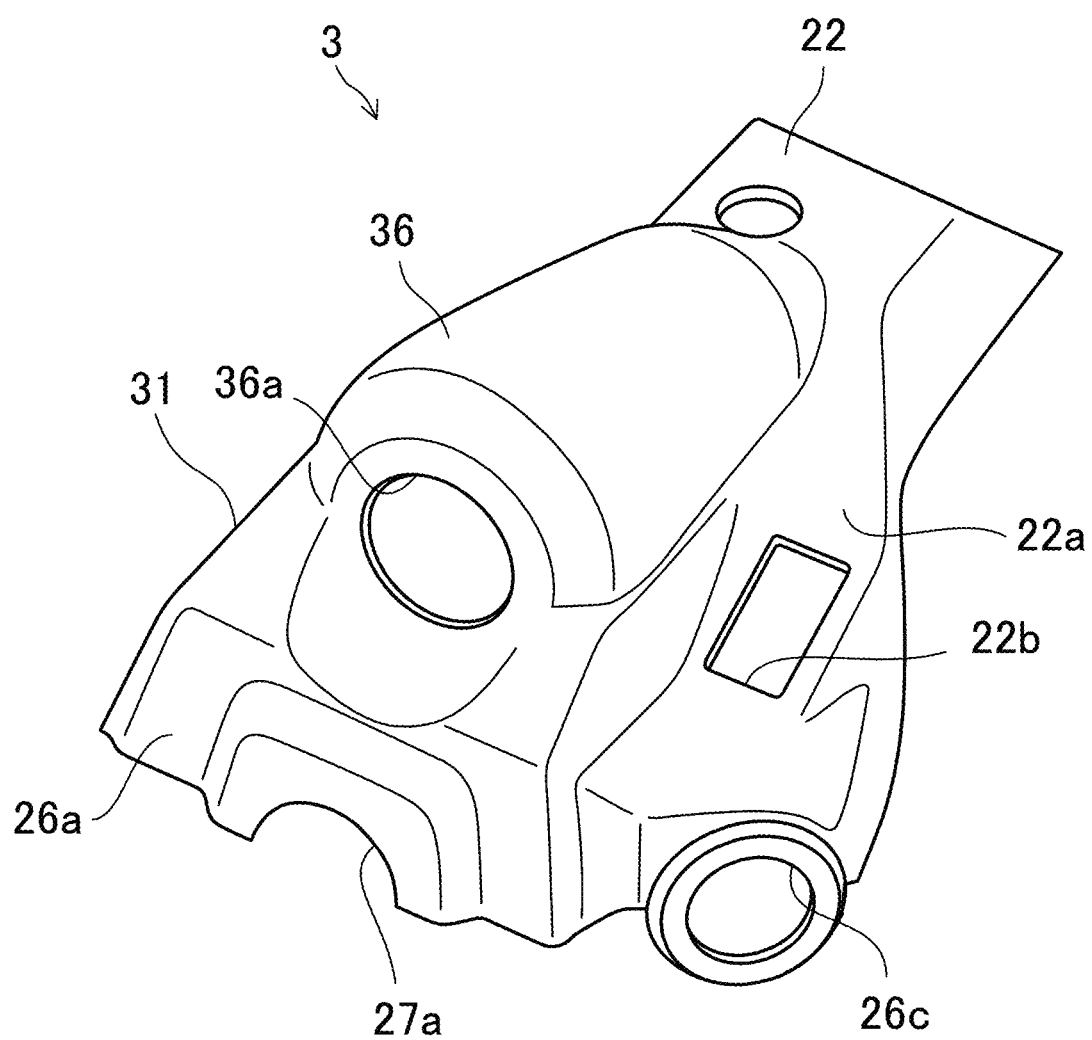
FIG. 9 is a perspective view of an upper cover.

FIG. 9 is a perspective view of the upper cover 3. A top portion 36 is located on the upper wall 22 of the upper cover 3. The top portion 36 has a first attachment hole 36a that is open rearward. The first attachment hole 36a has a closed annular shape, specifically, a circular shape. The first attachment hole 36a is used for attaching the meter 61 to the upper cover 3. The meter 61 is inserted in the first attachment hole 36a and attached to the upper cover 3. As illustrated in FIG. 4, the display 61a is exposed to the outside of the upper cover 3. The meter 61 is located substantially at the center of the upper cover 3 in the vehicle width directions. Specifically, the meter 61 is located substantially at the same position as the steering shaft 11 with respect to the vehicle width directions. That is, the meter 61 is located immediately above the steering shaft 11.

As illustrated in FIG. 9, the rear wall 26a has a second attachment hole 26c for attaching the ignition switch 62. The second attachment hole 26c has a closed annular shape, specifically, a circular shape. The ignition switch 62 is inserted in the second attachment hole 26c and attached to the upper cover 3. As illustrated in FIG. 4, the key cylinder is exposed to the outside from the upper cover 3. The ignition switch 62 is located at one side, for example, at the right, of the center of the upper cover 3 in the vehicle width directions.

As illustrated in the FIG. 9, the upper wall 22 includes a tilt wall 22a that tilts upward toward the dashboard panel 13 in the axial direction of the steering shaft 11, that is, rises forward. The tilt wall 22a has a third attachment hole 22b for attaching the direction switch 63 to the upper cover 3. The third attachment hole 22b has a closed annular shape, specifically, a square shape. The direction switch 63 is inserted in the third attachment hole 22b and attached to the upper cover 3. As illustrated in FIG. 4, the operation button 63a is exposed to the outside from the upper cover 3. The direction switch 63 is located at one side, for example, at the right, of the center of the upper cover 3 in the vehicle width directions. Since the tilt wall 22a tilts to have a front portion thereof slightly rise, the direction switch 63 can be seen easily from a driver. This can enhance operability of the direction switch 63.

As illustrated in FIG. 5, the left wall 25a of the upper cover 3 has a notch 28a. The notch 28a has a substantially square shape that is open downward, and is located at the lower edge of the left wall 25a. The left wall 25b of the lower cover 4 has a notch 28b. The notch 28b has a substantially square shape that is open upward, and is located at the upper edge of the left wall 25b. The notch 28a and the notch 28b are located at the same position in the axial direction. The notch 28a and the notch 28b define a substantially square opening 28. That is, the left wall 25 of the cover 2 has the opening 28 defined by the notch 28a and the notch 28b in the divided portion between the upper cover 3 and the lower cover 4. The turn signal switch 64 is located in the opening 28. As illustrated in FIG. 7, the turn signal switch 64 is attached to the steering shaft 11 in the cover 2. Most part of the turn signal switch 64 is located outside the cover 2 through the opening 28, as illustrated in FIG. 4. At least the lever 64a is located outside the cover 2. The turn signal switch 64 is not attached to the cover 2.

In this manner, the meter 61, the ignition switch 62, and the direction switch 63 are located only on the upper cover 3, and are not located on the lower cover 4. If the meter 61 and other members were located in the divided portion between the upper cover 3 and the lower cover 4 and attached to both the upper cover 3 and the lower cover 4, in attaching the upper cover 3 and the lower cover 4 to the steering shaft 11, alignment of the upper cover 3 and the steering shaft 11, alignment of the lower cover 4 and the steering shaft 11, alignment of the upper cover 3 and the lower cover 4, alignment of the upper cover 3 and the meter 61 and other members, and alignment of the lower cover 4 and the meter 61 and other members would be needed, and thus, assembly efficiency would degrade. On the other hand, since the meter 61 and other members are located only on the upper cover 3, the meter 61 and other members can be attached to the upper cover 3 beforehand before the upper cover 3 and the lower cover 4 are attached to the steering shaft 11. This can eliminate the necessity for alignment between the upper cover 3 and the meter 61 and other members and alignment between the lower cover 4 and the meter 61 and other members. As a result, assembly efficiency of the steering column module 10 can be enhanced.

In addition, integration of the meter 61, the ignition switch 62, and the direction switch 63 in the upper cover 3 can ease wiring work to the meter 61, the ignition switch 62, and the direction switch 63. Specifically, as illustrated in FIG. 7, a wire harness 60 connected to the meter 61, the ignition switch 62, and the direction switch 63 is located in the cover 2. Electric wires included in the wire harness 60 are connected to corresponding devices such as the meter 61, the ignition switch 62, and the direction switch 63. The integration of the meter 61, the ignition switch 62, and the direction switch 63 in the upper cover 3 can lay the wire harness 60 orderly in the cover 2.

As compared to a configuration in which the meter 61, the ignition switch 62, and the direction switch 63 are located on the dashboard panel 13, since the meter 61, the ignition switch 62, and the direction switch 63 are located on the upper cover 3, the meter 61, the ignition switch 62, and the direction switch 63 are located close to the driver. This can enhance operability of the meter 61, the ignition switch 62, and the direction switch 63.

Furthermore, since the meter 61, the ignition switch 62, and the direction switch 63 are located on the upper cover 3, the dashboard panel 13 does not need a space for disposing the meter 61, the ignition switch 62, and the direction switch 63 thereon. This can enhance aesthetic appearance of the dashboard panel 13. Alternatively, a space for placing a drink holder, a container, or other items on the dashboard panel 13 can be easily obtained.

As illustrated in FIG. 4, with respect to the circumferential direction about the axis X of the steering shaft 11, the direction switch 63 is located between the meter 61 and the ignition switch 62. Accordingly, the ignition switch 62 and the direction switch 63 can be placed by efficiently utilizing a space at one side of the meter 61 in the cover 2 (more specifically, the upper cover 3) in the circumferential direction. Positions of the ignition switch 62 and the direction switch 63 may or may not be the same in the axial direction and in the radial direction about the axis X.

With respect to the axial direction of the steering shaft 11, the direction switch 63 is located closer to the dashboard panel 13 than the ignition switch 62 is, that is, located forward of the ignition switch 62. Accordingly, the ignition 62 and the direction switch 63 can be placed by efficiently utilizing a space in the axial direction of the steering shaft 11, that is, in the front-rear direction, in the cover 2 (more specifically, the upper cover 3). Positions of the ignition switch 62 and the direction switch 63 may or may not be the same in the circumferential direction and the radial direction about the axis X.

The turn signal switch 64 is located at one side, for example, at the left, of the center of the upper cover 2 in the vehicle width direction. That is, with respect to the circumferential direction about the axis X of the steering shaft 11, the turn signal switch 64 is located on the opposite side to the ignition switch 62 with respect to the meter 61. Accordingly, the ignition switch 62 and the turn signal switch 64 can be placed by efficiently utilizing spaces on both sides of the meter 61 in the cover 2. Positions of the ignition switch 62 and the turn signal switch 64 may or may not be the same in the axial direction and in the radial direction about the axis X.

The turn signal switch 64 is located between the upper cover 3 and the lower cover 4, that is, in the divided portion between the upper cover 3 and the lower cover 4. Specifically, the turn signal switch 64 is located in the opening 28 defined by the notch 28a at the lower edge of the upper cover 3 and the notch 28b located at the lower edge of the lower cover 4. An operating force of the driver is applied to the lever 64a of the turn signal switch 64, and thus, the turn signal switch 64 is attached not to the upper cover 3 and the lower cover 4 but to the steering shaft 11. If the opening in which the turn signal switch 64 is inserted were located in one of the upper cover 3 and the lower cover 4, it would be necessary to insert the turn signal switch 64 in the opening while attaching the upper cover 3 and the lower cover 4 to the steering shaft 11. On the other hand, since the turn signal switch 64 is located between the notch 28a of the upper cover 3 and the notch 28b of the lower cover 4, the necessity for inserting the turn signal switch 64 in the opening is eliminated. In attaching the upper cover 3 and the lower cover 4 to the steering shaft 11, alignment processes among the upper cover 3, the lower cover 4, and the steering shaft 11 are needed, and thus, eliminating one or more of such alignment processes can enhance workability in attachment.

As described above, the upper cover 3 and the lower cover 4 are attached to the steering shaft 11 through the brackets 17 and the screws 18. The number of the screws 18 for attaching the upper cover 3 to the steering shaft 11 is smaller than the number of the screws 18 for attaching the lower cover 4 to the steering shaft 11. That is, the number of screws fastened portions between the upper cover 3 and the steering shaft 11 is smaller than the number of screws fastened portions between the lower cover 4 and the steering shaft 11. In this example, the number of the screws 18 for the upper cover 3 is one, as illustrated in FIG. 4. The number of the screws 18 for the lower cover 4 is three, as illustrated in FIG. 5. From the viewpoint of aesthetic appearance, the number of the screws 18 for attachment is preferably as small as possible. The driver is more likely to see the upper cover 3 than the lower cover 4. Since the number of the screws 18 for the upper cover 3 is smaller than the number of the screws 18 for the lower cover 4, aesthetic appearance of the cover 2 can be enhanced.

In addition, with respect to the axial direction of the steering shaft 11, the screw for attaching the upper cover 3 to the steering shaft 11 is located closer to the dashboard 13 than the meter 61 is, that is, located forward of the meter 16, as illustrated in FIG. 4. That is, with respect to the axial direction of the steering shaft 11, the screw fastened portion between the upper cover 3 and the steering shaft 11 is located closer to the dashboard 13 than the meter 61 is. The screw 18 for the upper cover 3 is located relatively close to the dashboard 13, that is, located relatively away from the driver. Accordingly, the screw 18 for the upper cover 3 is less likely to be seen from the driver so that aesthetic appearance of the cover 2 can be thereby further enhanced.

Furthermore, with respect to the axial direction of the steering shaft 11, the screw 18 for the upper cover 3 is located closer to the dashboard 13 than the top portion 36 is, that is, forward of the top portion 36, in the upper cover 3. The top portion 36 bulges upward from the cover body 31. That is, since the top portion 36 bulging upward is located between the screw 18 for the upper cover 3 and the driver, the driver is much less likely to see the screw 18 for the upper cover 3. This can further enhance aesthetic appearance of the cover 2.

The upper cover 3 is coupled to the lower cover 4 through the nails 38. Since the number of the screws 18 for the lower cover 4 is larger than the number of the screw 18 for the upper cover 3, the lower cover 4 is more firmly fixed to the steering shaft 11 than the upper cover 3 is. The coupling of the upper cover 3 to the lower cover 4 through the nails 38 can obtain attachment strength of the upper cover 3.

Other Embodiments

In the foregoing section, the embodiment has been described as an example of the technique disclosed in the present application. The technique disclosed here, however, is not limited to this embodiment, and is applicable to other embodiments obtained by changes, replacements, additions, and/or omissions as necessary. Components described in the above embodiment may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

The vehicle 100 may be a single-passenger vehicle. The vehicle 100 may be a vehicle with a single row of seats or a vehicle with three rows of seats. The vehicle 100 may also be a three-wheeled vehicle having three wheels, or may be a six-wheeled vehicle having six wheels.

The vehicle of the present disclosure may be an off-road vehicle or an on-road vehicle. The off-road vehicle may be an all terrain vehicle (ATV) or a tractor, for example.

The shapes of the upper cover 3 and the lower cover 4 are examples, and may be any shapes. The upper cover 3 only needs to have a shape that bulges upward and is open downward, and the upper wall 22, the right wall 24a, the left wall 25a, and the rear wall 26a do not need to be distinguished clearly. For example, the cross-sectional shape of the upper cover 3 orthogonal to the axis X may be an arch shape that curves as a whole. The same holds for the lower cover 4.

Devices other than the meter 61, the ignition switch 62, and the direction switch 63 may be located on the upper cover 3. Devices may be located on the lower cover 4.

A device other than the turn signal switch 64 may be located in the divided portion between the upper cover 3 and the lower cover 4.

The meter 61, the ignition switch 62, and the direction switch 63 in the upper cover 3 are not limited to the arrangement described above. For example, at least one of the ignition switch 62 or the direction switch 63 may be located closer to the turn signal switch 64 than the meter 61 is with respect to the circumferential direction about the axis X. The direction switch 63 may be located on the rear wall 26a. The ignition switch 62 may be located on the right wall 24a.

The lower cover 4 may include nails 38 to be engaged with the upper cover 3. The upper cover 3 may not include the nails 38. The upper cover 3 and the lower cover 4 do not need to be coupled to each other through the nails 38. For example, the upper cover 3 and the lower cover 4 may be coupled to each other through screws. Alternatively, the upper cover 3 and the lower cover 4 may not be coupled to each other and may be attached to the steering shaft 11 independently of each other.

The arrangement of the screws 18 of the upper cover 3 and the lower cover 4 is not limited to the example described above, and may be set arbitrarily. The number of the screws 18 for attaching the upper cover 3 to the steering shaft 11 may be two or more. The number of the screws 18 for attaching the lower cover 3 to the steering shaft 11 may be one, two, or four or more. The number of the screws 18 for attaching the upper cover 3 may be larger than or equal to the number of the screws 18 for attaching the lower cover 4.

The shape of the hood 15 of the dashboard panel 13 is not limited to the shape described above. For example, the outer peripheral surface of the hood 15 may not have a step. The hood 15 may be located on the entire circumference of the opening edge of the through hole 16. Alternatively, the dashboard panel 13 may not include the hood 15.

An end portion of the upper cover 3 close to the dashboard panel 13, that is, a front end portion, may overlap with the hood 15 from below.

[Aspects]

The embodiment described above is specific examples of the following aspects.

(Aspect 1)

The steering column module 10 includes: the upper cover 3 covering the steering shaft 11 from above; the lower cover 4 covering the steering shaft 11 from below and coupled to the upper cover 3; the meter 61 located on the upper cover 3; the ignition switch 62 located on the upper cover 3; and the direction switch 63 that is located on the upper cover 3 and switches the vehicle between forward movement and rearward movement.

In this configuration, the meter 61, the ignition switch 62, and the direction switch 63 may be located only on the upper cover 3. Accordingly, in attaching the upper cover 3 and the lower cover 4 to the steering shaft 11, alignment of the upper cover 3, the lower cover 4, and the steering shaft 11 with each other does not need alignment of the meter 61, the ignition switch 62, and the direction switch 63 with respect to the upper cover 3, the lower cover 4, and the steering shaft 11. As a result, assembly efficiency of the steering column module 10 can be enhanced.

In addition, integration of the meter 61, the ignition switch 62, and the direction switch 63 in the upper cover 3 can ease wiring work to the meter 61, the ignition switch 62, and the direction switch 63.

Furthermore, as compared to a configuration in which the meter 61, the ignition switch 62, and the direction switch 63 are located on the dashboard panel 13, the meter 61, the ignition switch 62, and the direction switch 63 are located close to the driver, and thus, operability of the meter 61, the ignition switch 62, and the direction switch 63 can be enhanced. Since the meter 61, the ignition switch 62, and the direction switch 63 do not need to be located on the dashboard panel 13, aesthetic appearance and design flexibility of the dashboard panel 13 can be increased.

(Aspect 2)

In the steering column module 10 of aspect 1, with respect to the circumferential direction about the axis X of the steering shaft 11, the direction switch 63 is located between the meter 61 and the ignition switch 62.

In this configuration, the ignition switch 62 and the direction switch 63 are located at one side of the meter 61 in the circumferential direction in the upper cover 3. Accordingly, the ignition switch 62 and the direction switch 63 can be arranged compactly by utilizing a space at one side of the meter 61 in the circumferential direction.

(Aspect 3)

In the steering column module 10 of aspect 1 or 2, the steering shaft 11 extends into the cabin through the dashboard panel 13, and with respect to the direction of the axis X of the steering shaft 11, the direction switch 63 is located closer to the dashboard panel 13 than the ignition switch 62 is.

In this configuration, the ignition switch 62 and the direction switch 63 can be arranged by effectively utilizing a space in the axis of the steering shaft 11, that is, in the front-rear direction, in the upper cover 3.

(Aspect 4)

In the steering column module 10 of any one of aspects 1 through 3 further includes the turn signal switch 64 located between the upper cover 3 and the lower cover 4.

In this configuration, the turn signal switch 64 can be located separately from the upper cover 3 and the lower cover 4. In attaching the upper cover 3 and the lower cover 4 to the steering shaft 11, the upper cover 3 and the lower cover 4 can be handled separately from the turn signal switch 64. For example, with the turn signal switch 64 attached to the steering shaft 11 beforehand, the upper cover 3 and the lower cover 4 can be attached to the steering shaft 11. Accordingly, workability in attaching the upper cover 3 and the lower cover 4 to the steering shaft 11 can be enhanced.

(Aspect 5)

In the steering column module 10 of any one of aspects 1 through 4, with respect to the circumferential direction about the axis X of the steering shaft 11, the turn signal switch 64 is located on the opposite side to the ignition switch 62 with respect to the meter 61.

In this configuration, the ignition switch 62 and the turn signal switch 64 can be located by effectively utilizing spaces on both sides of the meter 61 in the circumferential direction.

(Aspect 6)

In the steering column module 10 of any one of aspects 1 through 5, the upper cover 3 and the lower cover 4 are coupled to each other through the nail 38.

In this configuration, since the upper cover 3 and the lower cover 4 are coupled to each other, attachment strength of the upper cover 3 and the lower cover 4 is increased.

(Aspect 7)

In the steering column module 10 of any one of aspects 1 through 6, the nail 38 is included in the upper cover 3.

(Aspect 8)

In the steering column module 10 of any one of aspects 1 through 7, each of the upper cover 3 and the lower cover 4 is attached to the steering shaft 11 through the screw 18.

In this configuration, since each of the upper cover 3 and the lower cover 4 is attached to the steering shaft 11, attachment strength of the upper cover 3 and the lower cover 4 is increased.

(Aspect 9)

In the steering column module 10 of any one of aspects 1 through 8, the number of screws 18 for attaching the upper cover 3 to the steering shaft 11 is smaller than the number of screws 18 for attaching the lower cover 4 to the steering shaft 11.

In this configuration, the number of the screws 18 of the upper cover 3 is reduced so that aesthetic appearance of the upper cover 3 can be thereby enhanced. That is, the upper cover 3 is more easily visually recognized by a driver than the lower cover 4 is. As the number of the screws 18 of the upper cover 3 decreases, aesthetic appearance of the upper cover 3 can be enhanced. In addition, in a case where the upper cover 3 and the lower cover 4 are coupled to each other by the nails 38, since the lower cover 4 attached with a larger number of screws 18 has high attachment strength, coupling of the upper cover 3 and the lower cover 4 with the nails 38 obtains high attachment strength of the upper cover 3.

(Aspect 10)

In the steering column module 10 of any one of aspects 1 through 9, the steering shaft 11 extends into the cabin through the dashboard panel 13, and with respect to the direction of the axis X of the steering shaft 11, the screw 18 for attaching the upper cover 3 to the steering shaft 11 is located closer to the dashboard panel 13 than the meter 61 is.

In this configuration, the screws 18 of the upper cover 3 can be made less noticeable. That is, since a portion of the upper cover 3 closer to the rear is located closer to the driver, the portion of the upper cover 3 is more likely to be in the driver's line of sight. The meter 61 is located rearward of the screws 18, and thus, the meter 61 is easier for the driver to see, making the screws 18 less noticeable. As a result, aesthetic appearance of the upper cover 3 can be further enhanced.

(Aspect 11)

In the steering column module 10 of any one of aspects 1 through 10, the upper cover 3 and the lower cover 4 extend to the dashboard panel 13, the dashboard panel 13 includes the panel body 14 having the through hole 16 through which the steering shaft 11 penetrates, and the hood 15 projecting from the panel body 14 toward inside of the cabin on at least an upper portion of the opening edge of the through hole 16, and an end portion of the upper cover 3 close to the dashboard panel 13 overlaps with the hood 15.

In this configuration, an end portion of the upper cover 3 close to the dashboard panel 13, that is, a front end portion, overlaps with the hood 15. Accordingly, a gap between the front end portion of the upper cover 3 and the panel body 14 is closed by the hood 15. This can prevent visual recognition of the inside of the through hole 16 through the gap between the front end portion of the upper cover 3 and the panel body 14.

(Aspect 12)

In the steering column module 10 of any one of aspects 1 through 11, an end portion of the lower cover 4 close to the dashboard panel 13 faces the dashboard panel 13 outside the opening edge of the through hole 16.

In this configuration, a lower portion of the through hole 16 is located in the lower cover 4. That is, the lower portion of the through hole 16 is covered with the lower cover 4 to be hardly seen from the inside of the cabin. As described above, in the case where the upper portion of the through hole 16 is covered with the hood 15 and the upper cover 3, the entire through hole 16 is covered with the upper cover 3 and the lower cover 4.

(Aspect 13)

In the steering column module 10 of any one of aspects 1 through 12, the hood 15 is absent on at least a lower portion of the opening edge of the through hole 16.

In this configuration, the structure of the dashboard panel 13 is simplified. The steering column module 10 is visually recognized by the driver from above or from the rear. Thus, even in the presence of the gap between the front end portion of the lower cover 4 and the panel body 14, the inside of the through hole 16 is not easily seen from the driver through the gap. Even if the hood 15 is omitted on a lower portion of the opening edge of the through hole 16, aesthetic appearance of the dashboard panel 13 and other members is less likely to be impaired.

The invention claimed is:

1. A steering column module, comprising:
   an upper cover covering a steering shaft from above;
   a lower cover covering the steering shaft from below and coupled to the upper cover;
   a meter located on the upper cover;
   an ignition switch located on the upper cover; and
   a direction switch that is located on the upper cover and switches a vehicle between forward movement and rearward movement,
   wherein the ignition switch and the direction switch are located at one side of the center of the upper cover in a vehicle width direction.

2. The steering column module according to claim 1, wherein:
   with respect to a circumferential direction about an axis of the steering shaft, the direction switch is located between the meter and the ignition switch.

3. The steering column module according to claim 1, wherein:
   the steering shaft extends into a cabin through a dashboard panel, and
   with respect to a direction of the axis of the steering shaft, the direction switch is located closer to the dashboard panel than the ignition switch is.

4. The steering column module according to claim 1, further comprising:
   a turn signal switch located between the upper cover and the lower cover.

5. The steering column module according to claim 4, wherein:
   with respect to a circumferential direction about the axis of the steering shaft, the turn signal switch is located on an opposite side to the ignition switch with respect to the meter.

6. The steering column module according to claim 1, wherein:
   the upper cover and the lower cover are coupled to each other through a nail.

7. The steering column module according to claim 6, wherein:
   the nail is included in the upper cover.

8. The steering column module according to claim 6, wherein:
   each of the upper cover and the lower cover is attached to the steering shaft through a screw.

9. The steering column module according to claim 8, wherein:
   the number of screws for attaching the upper cover to the steering shaft is smaller than the number of screws for attaching the lower cover to the steering shaft.

10. The steering column module according to claim 8, wherein:
    the steering shaft extends into a cabin through a dashboard panel, and
    with respect to a direction of the axis of the steering shaft, the screw for attaching the upper cover to the steering shaft is located closer to the dashboard panel than the meter is.

11. The steering column module according to claim 1, wherein:
    the upper cover and the lower cover extend to a dashboard panel,
    the dashboard panel includes a panel body having a through hole through which the steering shaft penetrates, and a hood projecting from the panel body toward inside of a cabin on at least an upper portion of an opening edge of the through hole, and
    an end portion of the upper cover close to the dashboard panel overlaps with the hood.

12. The steering column module according to claim 11, wherein:
    an end portion of the lower cover close to the dashboard panel faces the dashboard panel outside the opening edge of the through hole.

13. The steering column module according to claim 11, wherein:
    the hood is absent at least on a lower portion of the opening edge of the through hole.

14. The steering column module according to claim 1, wherein:
    the upper cover includes a tilt wall that tilts upward toward a dashboard panel, and
    the direction switch is located on the tilt wall.

15. The steering column module according to claim 1, further comprising:
    a wire harness located between the upper cover and the lower cover, the wire harness electrically connecting the meter, the ignition switch, and the direction switch.

16. A steering column module, comprising:
    an upper cover covering a steering shaft from above;
    a lower cover covering the steering shaft from below and coupled to the upper cover;
    a meter located on the upper cover;
    an ignition switch located on the upper cover;
    a direction switch that is located on the upper cover and switches a vehicle between forward movement and rearward movement; and
    a turn signal switch located between the upper cover and the lower cover.

17. The steering column module according to claim 16, wherein:
    with respect to a circumferential direction about the axis of the steering shaft, the turn signal switch is located on an opposite side to the ignition switch with respect to the meter.

18. A steering column module comprising:
    an upper cover covering a steering shaft from above; and
    a lower cover covering the steering shaft from below and coupled to the upper cover,
    wherein the upper cover and the lower cover extend to a dashboard panel,
    the dashboard panel includes a panel body having a through hole through which the steering shaft penetrates, and a hood projecting from the panel body toward inside of a cabin on at least an upper portion of an opening edge of the through hole, and
    an end portion of the upper cover close to the dashboard panel overlaps with the hood.

19. The steering column module according to claim 18, wherein:
    an end portion of the lower cover close to the dashboard panel faces the dashboard panel outside the opening edge of the through hole.

20. The steering column module according to claim 18, wherein:

the hood is absent at least on a lower portion of the opening edge of the through hole.

* * * * *